(12) United States Patent
Brenn et al.

(10) Patent No.: US 12,534,066 B2
(45) Date of Patent: Jan. 27, 2026

(54) METHOD AND SYSTEM FOR AUTOMATED PARKING OF A VEHICLE

(71) Applicant: Continental Automotive Technologies GmbH, Hannover (DE)

(72) Inventors: Martin Brenn, Mainz (DE); Heinz-Anton Schneider, Niedernhausen (DE); Carsten Handel, Ginsheim-Gustavsburg (DE); Frank Sader, Königstein (DE)

(73) Assignee: Continental Automotive Technologies GmbH, Hannover (DE)

( * ) Notice: Subject to any disclaimer, the term of this patent is extended or adjusted under 35 U.S.C. 154(b) by 130 days.

(21) Appl. No.: 18/245,326

(22) PCT Filed: Aug. 12, 2021

(86) PCT No.: PCT/DE2021/200106
§ 371 (c)(1),
(2) Date: Mar. 14, 2023

(87) PCT Pub. No.: WO2022/053113
PCT Pub. Date: Mar. 17, 2022

(65) Prior Publication Data
US 2023/0398981 A1    Dec. 14, 2023

(30) Foreign Application Priority Data

Sep. 14, 2020   (DE) ..................... 10 2020 211 522.2

(51) Int. Cl.
*B60W 10/18*   (2012.01)
*B60W 10/20*   (2006.01)
*B60W 30/06*   (2006.01)

(52) U.S. Cl.
CPC .......... *B60W 30/06* (2013.01); *B60W 10/182* (2013.01); *B60W 10/20* (2013.01); *B60W 2710/18* (2013.01); *B60W 2756/10* (2020.02)

(58) Field of Classification Search
CPC .... B60W 30/06; B60W 10/182; B60W 10/20; B60W 2710/18; B60W 2756/10; B60S 3/047; B62D 15/0285
(Continued)

(56) References Cited

U.S. PATENT DOCUMENTS 8,152,247 B2 *   4/2012   Colin ...................... B64C 25/24
                                                           303/199
9,789,863 B2 *  10/2017   Straub ................... B60T 13/746
(Continued)

FOREIGN PATENT DOCUMENTS

CA        3078353 A1 * 11/2020 ............ B60T 8/1703
CN       103328282 A      9/2013
(Continued)

OTHER PUBLICATIONS

Thomas et al.; DE102017211398.translate; Parking Assistence System. (Year: 2019).*
(Continued)

*Primary Examiner* — B M M Hannan

(57) ABSTRACT

A method for automated parking of a vehicle by means of a parking assistance system, comprises the parking assistance system requesting activation of a holding device in order to hold the vehicle stationary. For safety reasons, a vehicle monitoring system monitors a movement of the vehicle and, based on the movement established, decides whether the vehicle has been successfully held by means of the holding device, the vehicle being secured independently of the holding device and/or a warning signal being output if holding is not successful.

19 Claims, 4 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 11,261,966 | B2* | 3/2022 | Kirchner | F16H 63/3425 |
| 2004/0201270 | A1* | 10/2004 | Suzuki | B60T 13/741 |
| | | | | 303/20 |
| 2005/0046271 | A1* | 3/2005 | Suzuki | B60T 13/741 |
| | | | | 303/20 |
| 2010/0051395 | A1* | 3/2010 | Sano | B60T 13/741 |
| | | | | 188/162 |
| 2011/0005874 | A1* | 1/2011 | Beier | B60T 13/66 |
| | | | | 188/106 P |
| 2011/0017554 | A1* | 1/2011 | Baehrle-Miller | B60T 8/32 |
| | | | | 188/72.1 |
| 2011/0295478 | A1* | 12/2011 | Jeon | B60T 7/107 |
| | | | | 701/70 |
| 2012/0073922 | A1* | 3/2012 | Kaestner | B60W 10/188 |
| | | | | 303/3 |
| 2012/0153753 | A1* | 6/2012 | Hanlon | F16D 55/36 |
| | | | | 29/428 |
| 2012/0205202 | A1* | 8/2012 | Baehrle-Miller | B60T 13/588 |
| | | | | 188/106 P |
| 2013/0226425 | A1 | 8/2013 | Oliveria et al. | |
| 2014/0180535 | A1 | 6/2014 | Baehrle-Miller et al. | |
| 2015/0217737 | A1* | 8/2015 | Hauber | F16D 65/18 |
| | | | | 188/72.3 |
| 2015/0329116 | A1* | 11/2015 | Bulgrien | B60W 30/181 |
| | | | | 192/219.4 |
| 2015/0344007 | A1 | 12/2015 | Lee | |
| 2016/0214595 | A1 | 7/2016 | Baehrle-Miller et al. | |
| 2016/0229415 | A1* | 8/2016 | Laakmann | B60N 2/0022 |
| 2018/0148033 | A1* | 5/2018 | Mannherz | B60T 13/145 |
| 2018/0215384 | A1 | 8/2018 | Mannherz et al. | |
| 2019/0243382 | A1* | 8/2019 | Takaki | G01C 21/3691 |
| 2019/0302754 | A1* | 10/2019 | Tsuruoka | G05D 1/0212 |
| 2020/0023825 | A1 | 1/2020 | Mitchell | |
| 2020/0353906 | A1* | 11/2020 | Frey | B64C 25/44 |
| 2021/0089048 | A1* | 3/2021 | Tran | B60R 25/257 |
| 2021/0108926 | A1* | 4/2021 | Tran | G06T 17/05 |
| 2021/0188238 | A1* | 6/2021 | Smith | B60T 13/74 |
| 2021/0304605 | A1* | 9/2021 | Mizuno | G08G 1/146 |

FOREIGN PATENT DOCUMENTS

| | | | | | |
|---|---|---|---|---|---|
| CN | 105270363 | A | | 1/2016 | |
| CN | 106467107 | A | | 3/2017 | |
| CN | 106926833 | A | | 7/2017 | |
| CN | 108430842 | A | | 8/2018 | |
| CN | 109747815 | A | * | 5/2019 | ............ B60T 13/746 |
| CN | 110869254 | A | * | 3/2020 | ............ B60T 13/58 |
| CN | 109715451 | B | * | 7/2021 | ............ B60T 13/66 |
| DE | 102005043608 | B4 | * | 1/2008 | ............ B60T 13/683 |
| DE | 102007028567 | A1 | | 2/2008 | |
| DE | 102009035771 | A1 | | 3/2010 | |
| DE | 102010062013 | A1 | | 3/2012 | |
| DE | 102011003183 | A1 | | 7/2012 | |
| DE | 102013218401 | A1 | | 3/2015 | |
| DE | 102015006915 | A1 | | 12/2015 | |
| DE | 102015206582 | A1 | | 10/2016 | |
| DE | 102017119413 | A1 | * | 3/2018 | ............ B60T 13/74 |
| DE | 102017211398 | A1 | | 1/2019 | |
| DE | 102017212364 | A1 | | 1/2019 | |
| DE | 102019108558 | A1 | * | 10/2019 | ............ B60W 30/06 |
| DE | 102018113823 | A1 | | 12/2019 | |
| EP | 1327553 | A2 | | 7/2003 | |
| EP | 3204660 | B1 | * | 10/2021 | ............ B60T 13/588 |
| JP | 2003206780 | A | | 7/2003 | |
| JP | 2005313775 | A | * | 11/2005 | |
| JP | 2018523606 | A | | 8/2018 | |
| JP | 2020128151 | A | * | 8/2020 | |
| JP | 7127289 | B2 | * | 8/2022 | ............ B60W 30/182 |
| WO | 9938738 | A1 | | 8/1999 | |
| WO | WO-2007028586 | A1 | * | 3/2007 | ............ B60T 13/683 |

OTHER PUBLICATIONS

Sugawara et al.; JP2005313775.translate; Automatic Steering Parking Support Device. (Year: 2005).*

KR Office action dated Aug. 28, 2024 of counterpart KR application No. 10-2023-7006792.

German Search Report dated Jul. 8, 2021 for the counterpart German Patent Application No. 10 2020 211 522.2.

The International Search Report and the Written Opinion of the International Searching Authority mailed on Oct. 14, 2021 for the counterpart PCT Application No. PCT/DE2021/200106.

Examination Report dated Jan. 26, 2024; of the counterpart European application 21763230.6.

Chinese Office Action dated Jan. 10, 2025 for the counterpart Chinese Patent Application No. 202180061924.0 and machine translation of same.

Notice of Final Rejection dated Apr. 22, 2025 for the counterpart Korean Patent Application No. 10 2023 7006792 and machine translation of same.

Korean Office Action dated Jul. 30, 2025 for the counterpart Korean Patent Application No. 10-2025-7024512 and machine translation of same.

Chinese Second Office Action dated Jun. 16, 2025 for the counterpart Chinese Patent Application No. 202180061924.0 and machine translation of same.

* cited by examiner

METHOD AND SYSTEM FOR AUTOMATED PARKING OF A VEHICLE

CROSS-REFERENCE TO RELATED APPLICATIONS

The present application is a National Stage Application under 35 U.S.C. § 371 of International Patent Application No. PCT/DE2021/200106 filed on Aug. 12, 2021, and claims priority from German Patent Application No. 10 2020 211 522.2 filed on Sep. 14, 2020, in the German Patent and Trademark Office, the disclosures of which are herein incorporated by reference in their entireties.

TECHNICAL FIELD

The invention relates to a method for automated parking of a vehicle by a parking assistant, the parking assistant requesting that the vehicle be held by means of a holding device.

BACKGROUND

Parking assistants are gradually being offered in existing vehicles, said parking assistants being distinguished in that the parking procedure is controlled by a computer system which detects the surroundings via sensors and uses the steering, brake and drive actuators to move the vehicle in such a way that it carries out the parking and pulling-out procedure successfully and at the end secures the vehicle, for example using an electromechanical parking brake.

In this procedure, for safety reasons the moving vehicle can be stopped at any time and then secured without the driver having to be present inside or even outside the vehicle.

Braking is usually carried out using the hydraulic service brake system and the vehicle is finally secured using the electric parking brake. The actuators are controlled via an integrated brake control device with a parking brake actuation means, or redundant parking brake architectures are used, in which a right-hand-side and a left-hand-side parking brake actuator are actuated by different control devices.

The software in the brake control device or the corresponding HOST control device controls the electromechanical parking brake here and monitors the voltages and currents of the parking brake actuators in order to determine whether their clamping force is sufficient to hold the vehicle securely.

The challenge with this architecture is that the parking brake is actuated via a single channel on the safety side and the entire system is dependent on the software for actuating the parking brake correctly determining whether the required slope holding force is set.

The current and voltage measurement is usually determined by a mechatronic circuit and undetected errors or faults (EMC, aging, systematic errors) lead to corruption of the measurement variables and can therefore lead to an unintended indication that a vehicle is securely held even though the slope holding force is not sufficient.

The object is therefore to ensure that the vehicle is secured during an automated parking maneuver independently of the driver.

SUMMARY

A method for automated parking of a vehicle by means of a parking assistance system comprises activation of a holding device in order to hold the vehicle stationary being requested by the parking assistance system. Provision is made for a vehicle monitoring system to monitor a movement of the vehicle and, based on the movement established, decide whether the vehicle has been successfully held by means of the holding device, the vehicle being secured independently of the holding device and/or a warning signal being output if holding is not successful.

In an embodiment, the holding device is an electromechanical parking brake. Electromechanical parking brakes are replacing manual parking brakes to an increasing extent and can therefore be used particularly easily in order to hold the vehicle stationary after an automated parking maneuver and thereby secure it.

The parking assistance system can request application of the electromechanical parking brake with the aid of a tensioning request in a brake control device, for example when the parking procedure is ended normally or when it is aborted by a dead man's switch. In addition, during an automated parking maneuver, communication with the parking assistance system is monitored by the brake control device and if secure communication between the parking assistance system and the brake control device is lost, automatic application of the parking brake is triggered and the vehicle monitoring system is accordingly activated.

In general, the parking assistance system can actuate a drive, a service brake and a steering system of the vehicle in order to drive the vehicle into a parking space in an automated manner. After braking to the stationary state, usually by a hydraulic service brake, the vehicle is secured, i.e. held stationary, by application of the electromechanical parking brake.

The parking assistance system can communicate with the brake control device via a corresponding interface, for example a CAN bus, which has an actuation means for the hydraulic service brake and for the electromechanical parking brake which actuate the respective actuators via corresponding interfaces.

In an embodiment, the vehicle monitoring system monitors the movement of the vehicle by means of at least one wheel speed sensor. Since the corresponding sensor system is already present in all vehicles, the method can therefore be implemented in a cost-effective manner.

In an embodiment, holding of the vehicle by means of the holding device is assumed to be successful if the movement of the vehicle does not exceed a first threshold. The first threshold may be a speed threshold. For example, the vehicle is assumed to be stationary at speeds of below 1 km/h. If the first threshold is not exceeded for a predefined time, for example 1 second, it is assumed that the vehicle has been successfully held. As an alternative, the first threshold may be a distance threshold. A check is therefore made as to whether the vehicle has covered less than a maximum distance since the holding device was activated.

In an embodiment, the vehicle monitoring system is activated with the request to activate the holding device. The vehicle monitoring system can be activated explicitly by a corresponding command from the parking assistance system, or the vehicle monitoring system likewise receives the command to apply the holding device and activates itself automatically.

In an embodiment, a parking brake actuation unit monitors the currents and voltages when the electromechanical parking brake is applied, in order to set a reliable holding force. Predefined values can be used to determine whether a reliable holding force has been generated.

In one embodiment, the parking brake actuation unit monitors a vehicle movement and the electromechanical parking brake is applied again when a vehicle movement that is greater than a second threshold is established. This reactive re-tensioning is likewise triggered by the detected vehicle movement. During re-tensioning, however, the same sensor system and logic system that were also used when the parking brake was previously applied are used to apply the parking brake actuator. If there is now a systematic error in the sensor system or logic system here, the re-tensioning procedure will likewise report successful re-tensioning even though the slope holding force is not sufficient. Therefore, the re-tensioning logic system alone cannot ensure that the vehicle is held securely, but rather can do so only in combination with the described securing independently of the electromechanical parking brake or corresponding warning signals.

In a further embodiment, the second threshold of the parking brake actuation unit for renewed application of the electromechanical parking brake is more sensitive than the first threshold of the vehicle monitoring system. A more sensitive threshold means that the second threshold is exceeded before the first threshold. The second threshold can be, for example, a lower speed threshold. The renewed application is therefore triggered very early on and securing independently of the holding device is employed only when the vehicle moves to a greater extent. This prevents simultaneous and therefore unnecessary activation.

In a further embodiment, the parking brake actuation unit notifies the vehicle monitoring system when it applies the electromechanical parking brake again, the vehicle monitoring system then not intervening. While a corresponding signal is set and possibly for an additional period of time, for example one second, the vehicle monitoring system suppresses its activity. This also prevents simultaneous and unnecessary activation.

In an embodiment, a service brake is actuated in order to secure the vehicle independently of the holding device. Said service brake may be a hydraulic service brake or else an electromechanical service brake. By means of actuating the hydraulic service brake, hydraulic pressure is built up in the brake system in order to securely hold the vehicle. Although this procedure cannot be carried out permanently due to the continuous energy consumption, it can however hold the vehicle stationary very quickly and reliably.

In an embodiment, the hydraulic service brake is operated in such a way that a hydraulic pressure is held by means of hydraulic valves independently of the energy supply to a pressure application unit. The pressure is therefore not maintained via hydraulic pumps and/or a linear actuator but rather locked in by means of hydraulic valves once the pressure has been built up by the pressure application unit. The energy consumption is thus reduced to holding of the electromechanically actuated valves.

In an alternative embodiment, the hydraulic service brake is operated in such a way that a linear actuator maintains the pressure, said linear actuator being operated in a mode in which the pressure is readjusted only when there is an increased deviation from a setpoint value compared to normal operation. In such an energy-efficient mode, any changes in pressure are not corrected immediately, provided that they do not leave an expanded pressure adjustment corridor.

In an embodiment, when a vehicle movement is identified by the vehicle monitoring system, the vehicle is autonomously driven to a position with a lower roadway incline in order to secure the vehicle independently of the holding device. In such a position, a lower holding force is sufficient in order to prevent the vehicle from rolling away.

In an embodiment, when a vehicle movement is identified by the vehicle monitoring system, the vehicle will autonomously set a maximum steering angle and/or opposite steering angles on a left-hand-side and a right-hand-side wheel in order to secure the vehicle independently of the holding device. This leads to an increased resistance to rolling and can therefore prevent the vehicle from rolling away, for example in combination with at least a reduced holding force of the holding device.

In an embodiment, when a vehicle movement is identified by the vehicle monitoring system, the vehicle will automatically engage a parking lock of the drive train, for example a transmission pawl, in order to secure the vehicle independently of the holding device.

In an embodiment, a request for the output of the warning signal is transmitted to a superordinate vehicle control unit via an interface of the parking assistance system and/or a vehicle network. The vehicle is therefore informed that permanent and secure holding using the parking brake is no longer possible.

According to ECE R79, the driver is obliged to monitor the vehicle during the parking procedure in existing approved parking assistance systems. In this case, said driver has to react to the unsuccessful parking procedure and has the opportunity to safely take control of the vehicle by briefly hydraulically holding the vehicle.

In future parking assistance systems, the driver may no longer be obliged to monitor the vehicle or may no longer be able to monitor it. In this case, the parking assistance system has to autonomously transfer the vehicle to a safely parked state.

In an embodiment, the warning signal can be output via an ignition key, a smartphone, a horn and/or a hazard warning light. In this way, not only the driver of the vehicle but also bystanders can be informed that the vehicle has not been successfully secured, in order to leave the danger area if desired.

The information from the superordinate vehicle system, the output of warning signals and the actuation of the steering system and/or a transmission pawl can also be carried out in the event of a total failure of the brake system without the involvement of the brake system. For this purpose, the parking assistance system control device can continuously monitor the brake system control device via the communication channel (e.g. CAN) and if it logs off or there is no communication, it can trigger one or more of the above actions.

The object is also achieved by a corresponding system for automated parking of a vehicle, having a parking assistance system and a brake system, designed to actuate a holding device at the request of the parking assistance system, the system having a vehicle monitoring system and being designed to execute an above method.

In an embodiment, the vehicle monitoring system is implemented in a control device of the brake system. It can therefore initiate securing of the vehicle without access to another control device.

In an embodiment, the brake system has a first control device for controlling a hydraulic service brake and a second control device for controlling the electromechanical parking brake, the vehicle monitoring system being implemented in the second control device. The two-part control device further increases the fail-safety of the system.

In a further embodiment, the vehicle monitoring system is implemented in an additional control device.

A single-channel system is therefore transformed by measures into a two-channel system in which safe parking of the vehicle can be ensured via two separate different paths, monitor path and actuator path.

DETAILED DESCRIPTION

Figure 1:
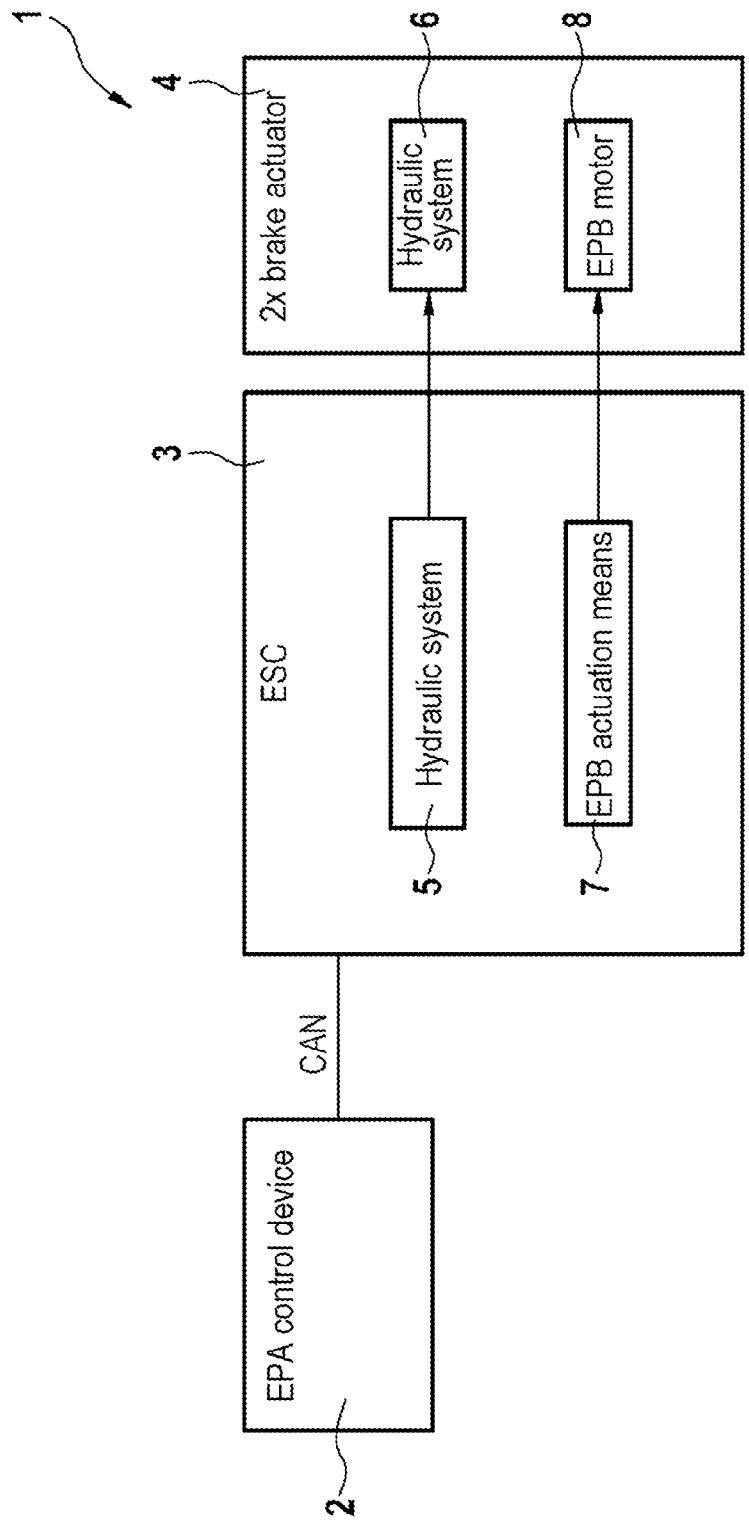
FIG. 1 shows an architecture, known from the prior art, of a system for automatically parking a vehicle.

FIG. 1 schematically shows a system 1 for automatically parking a vehicle having a parking assistance system, which is implemented on an EPA (Electronic Parking Assistant) control device 2. This EPA control device can communicate with a brake control device 3 via a CAN bus in order to brake the vehicle by means of a brake 4 and to apply a parking brake 8.

The brake control device 3 is embodied as an ESC control device, i.e. it is designed to generate driver-independent braking forces at individual wheels in order to control the stability of the vehicle. The brake system 3 has a hydraulic actuation means 5 which is set up to actuate corresponding actuators of a hydraulic service brake 6. The brake system 3 further has a parking brake actuation means 7 which is set up to actuate and to monitor one or more corresponding electromechanical actuators of the parking brake 8.

Figure 2:
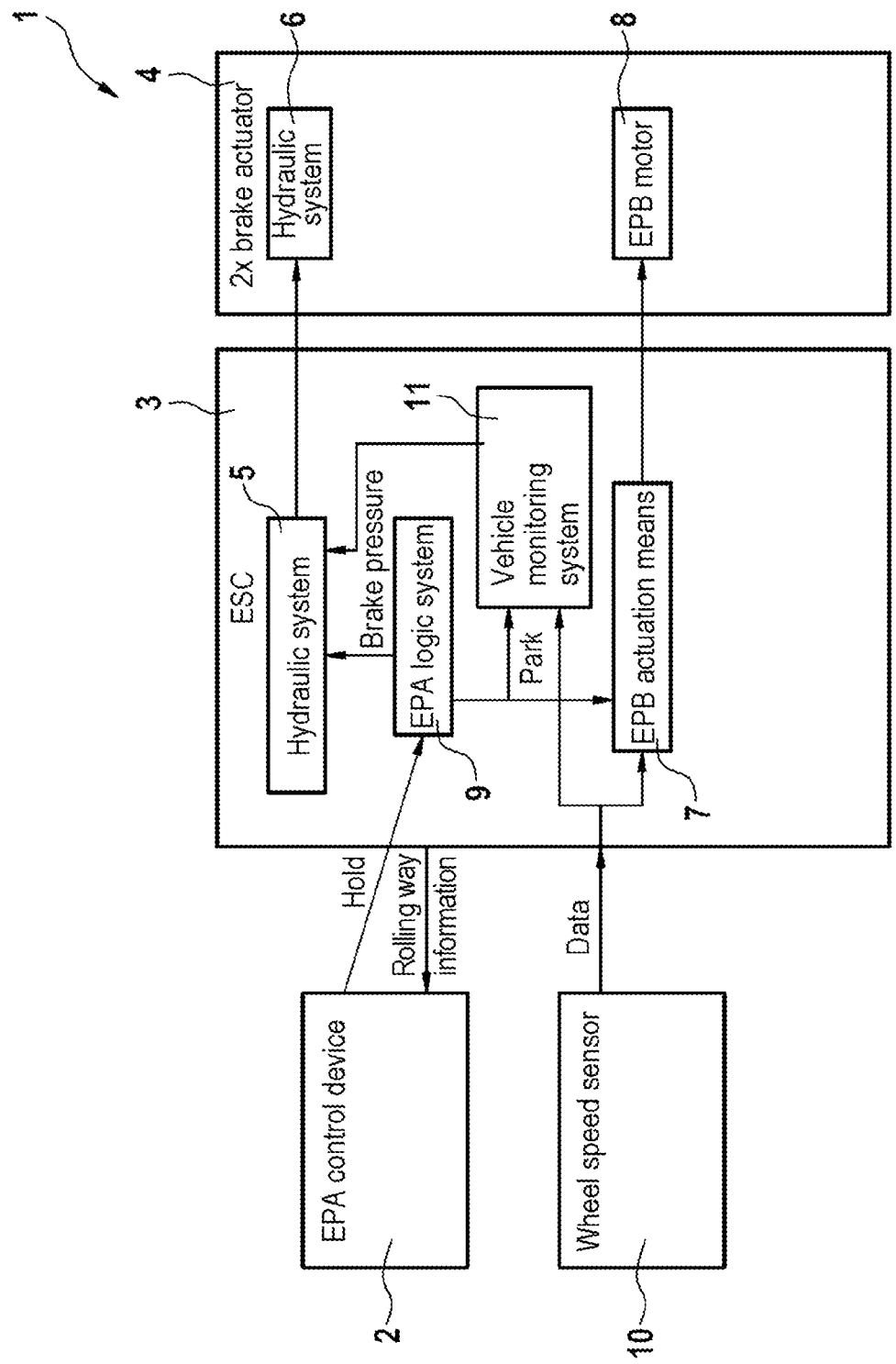
FIG. 2 shows an architecture of a first embodiment.

FIG. 2 now shows an expansion of the system from FIG. 1 which is expanded to include the vehicle monitoring system 11. For example, at the end of a parking maneuver, the EPA control device 2 sends a command to the EPA logic system 9 implemented in the brake system in order to secure the vehicle by means of the electromechanical parking brake 8. The EPA logic system 9 forwards this command firstly to the EPB actuation means 7 and also activates the vehicle monitoring system 11. The EPB actuation means 7 correspondingly activates the parking brake actuators 8 in order to apply the parking brake. The EPB actuation means 7 further receives data from a wheel speed sensor 10 with which the vehicle speed can be determined. If the vehicle moves despite the electromechanical parking brake 8 being applied, the EPB actuation means 7 carries out re-tensioning, in the case of which the electromechanical parking brake 8 is applied again. The data from the wheel speed sensor 10 is also used by the vehicle monitoring system 11 in order to likewise monitor the movement of the vehicle. If the vehicle continues to move despite a possible attempt at re-tensioning by the EPB actuation means 7, the vehicle monitoring system 11 issues a corresponding command to the hydraulic controller 5 of the brake system. The hydraulic controller 5 then correspondingly actuates the hydraulic service brake 6 in order to generate a brake pressure and thus secure the vehicle. The vehicle monitoring system 11 can further pass on the information about the vehicle's movement to the EPA control device 3, which can inform a superordinate vehicle controller in order to output corresponding warning signals. The EPA logic system 9 is also set up to automatically request braking of the vehicle when communication with the EPA control device 3 is aborted.

Figure 3:
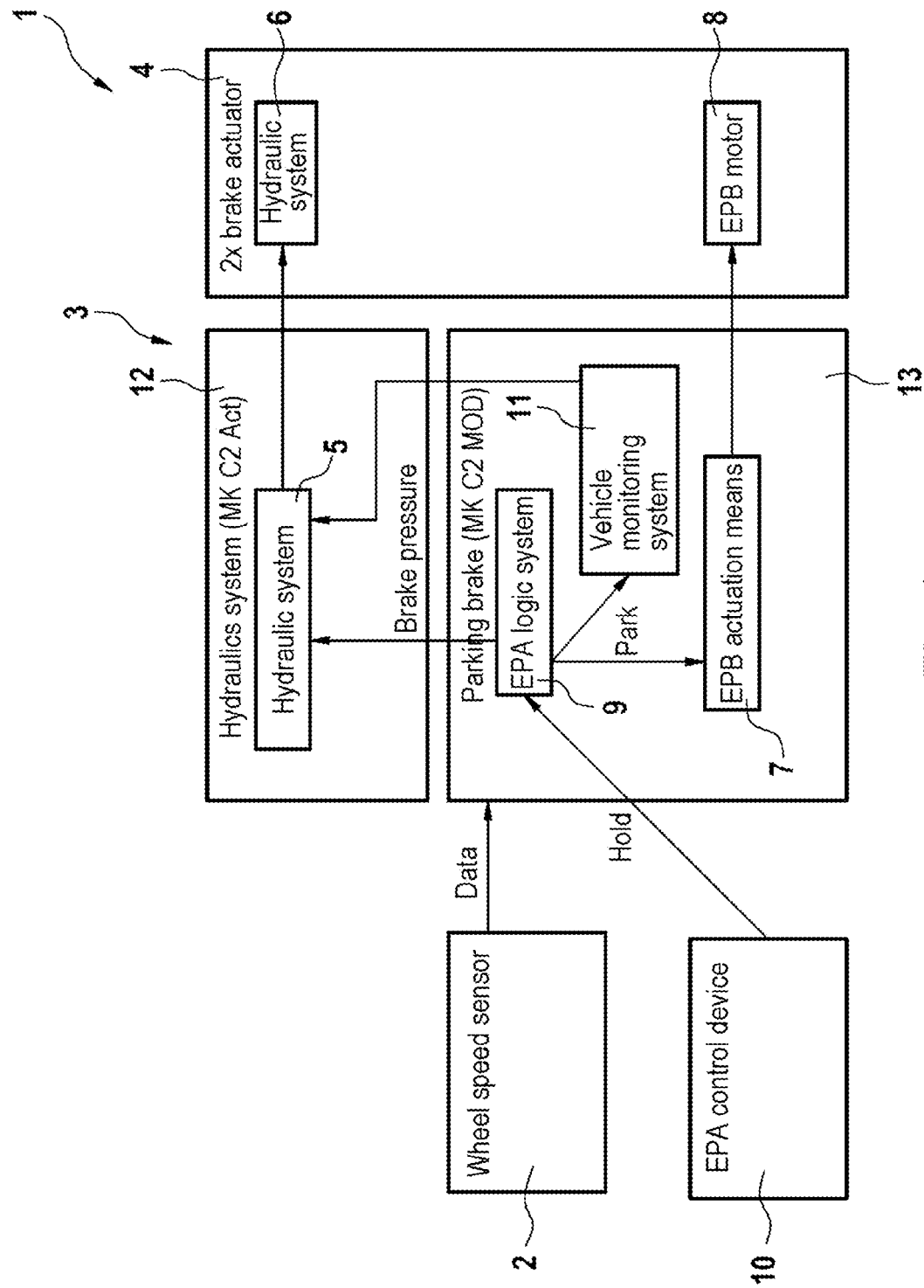
FIG. 3 shows an architecture of a second embodiment.

FIG. 3 shows an alternative embodiment, in which the brake control device 3 is constructed in two parts and therefore has a hydraulic control unit 12 and a separate parking brake control unit 13. The EPA logic system 9 is arranged on the control unit 13 of the parking brake and the EPA control device 2 therefore communicates with the control unit 13 of the parking brake. The vehicle monitoring system 11 is also implemented on the parking brake control unit 13 and, when activated, communicates with the hydraulic control unit 12 via a corresponding interface. The vehicle monitoring system 11 can therefore activate the hydraulic service brake 6 via the hydraulic controller 5.

Figure 4:
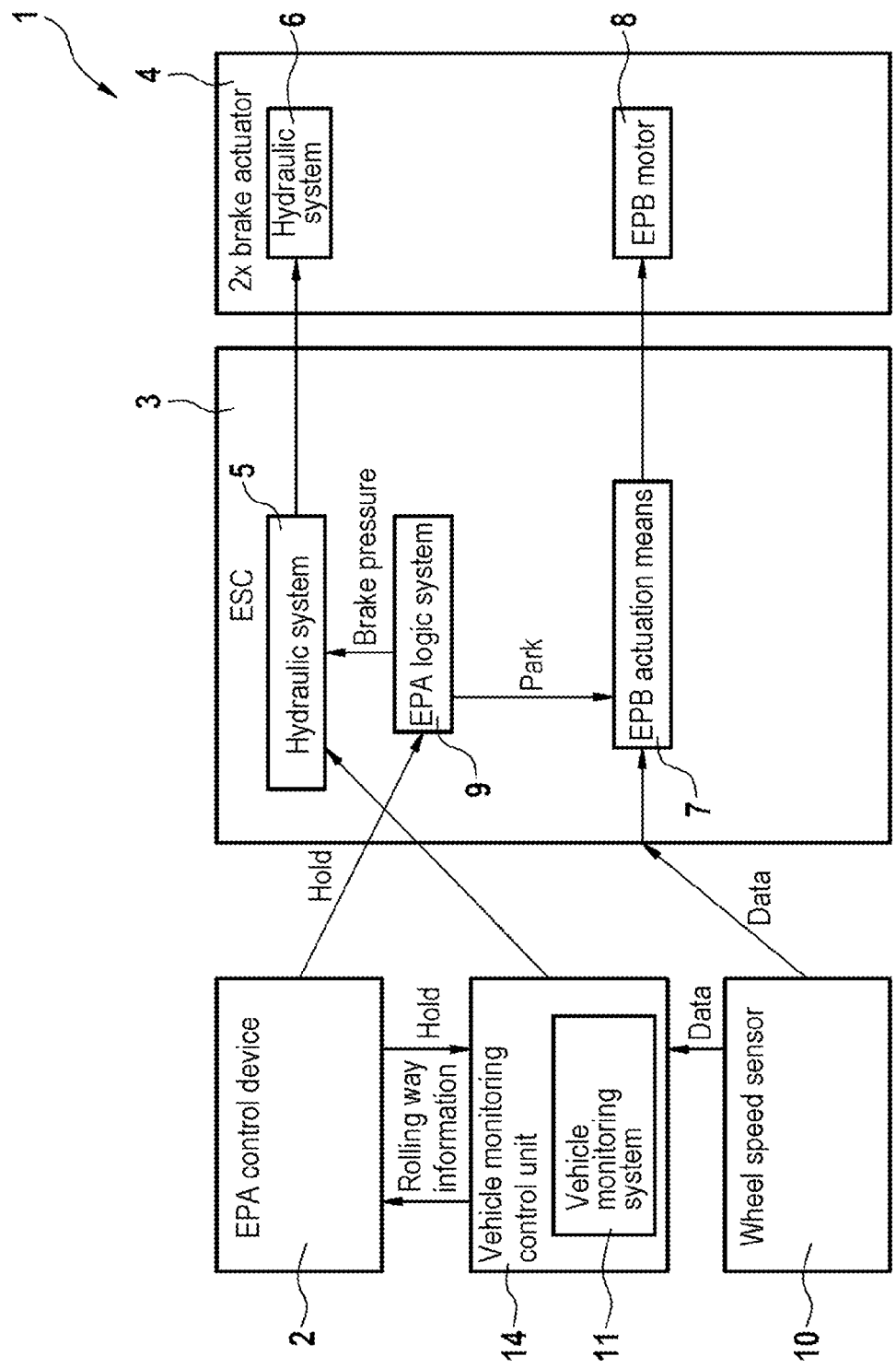
FIG. 4 shows an architecture of a third embodiment.

FIG. 4 shows a further alternative embodiment, in which the vehicle monitoring system 11 is formed on a separate control unit 14. This control unit then communicates with the brake control device 3 via corresponding interfaces in order to activate the hydraulic service brake if necessary. In this case too, the brake control device 3 can be constructed in two parts, as in FIG. 3. The vehicle monitoring system 11 also communicates with the EPA control device 2 in order to receive commands to request the application of the parking brake 8, so that the vehicle monitoring system 11 can be activated. If the vehicle monitoring system 11 establishes that the vehicle is still moving in a parking situation, it can transmit this information to the EPA control device 2. The vehicle monitoring system 11 further receives information from the wheel speed sensor 10 in order to be able to establish movement of the vehicle.

The invention claimed is:

1. A method for automated parking of a vehicle comprising:
   requesting activation of an electromechanical parking brake with a first control unit of a parking assistance system in order to hold the vehicle stationary;
   activating the electromechanical parking brake using a second control unit;
   monitoring a movement of the vehicle with a vehicle monitoring system using the second control unit; and,
   deciding with the second control unit based on the monitored movement whether the vehicle has been successfully held by the electromechanical parking brake;
   monitoring currents and voltages in a parking brake actuation unit with the second control unit when the electromechanical parking brake is applied to set a predetermined holding force; and
   at least one of securing the vehicle independently of the holding device and outputting a warning signal with the second control unit when the holding is not successful.

2. The method as claimed in claim 1, wherein the monitoring further comprises monitoring the movement of the vehicle with at least one wheel speed sensor.

3. The method as claimed in claim 1, wherein the holding of the vehicle is successful when the movement of the vehicle does not exceed a first threshold.

4. The method as claimed in claim 1, further comprising activating the vehicle monitoring system by the parking assistance system with the request to activate the electromechanical parking brake.

5. The method as claimed in claim 1, further comprises monitoring a vehicle movement with the parking brake actuation unit and applying the electromechanical parking brake again when a vehicle movement that is greater than a second threshold is established.

6. The method as claimed in claim 5, wherein the second threshold of the parking brake actuation unit for renewed application of the electromechanical parking brake is more sensitive than the first threshold of the vehicle monitoring system.

7. The method as claimed in either of claim 5, further comprising notifying the vehicle monitoring system from the parking brake actuation unit when the parking brake actuation unit applies the electromechanical parking brake again, the vehicle monitoring system then not intervening.

8. The method as claimed in claim 1, further comprising actuating a hydraulic service brake to secure the vehicle independently of the electromechanical parking brake.

9. The method as claimed in claim 8, further comprising holding a hydraulic pressure with hydraulic valves independently of supplying energy to a pressure application unit.

10. The method as claimed in claim 8, further comprising maintaining the pressure in the hydraulic service brake with a linear actuator, said linear actuator being operated in a mode in which the pressure is readjusted only when there is an increased deviation from a setpoint value compared to normal operation.

11. The method as claimed in claim 1, further comprising autonomously moving the vehicle to a position with a lower roadway incline to secure the vehicle independently of the electromechanical parking brake.

12. The method as claimed in claim 1, further comprising autonomously setting at least one of a maximum steering angle and opposite steering angles on a left-hand-side and a right-hand-side wheel of the vehicle in order to secure the vehicle independently of the electromechanical parking brake.

13. The method as claimed in claim 1, further comprising autonomously engaging a parking lock of a drive train to secure the vehicle independently of the electromechanical parking brake.

14. The method as claimed in claim 1, further comprising transmitting a request for the output of the warning signal to a superordinate vehicle control unit via at least one of one of an interface of the parking assistance system and a vehicle network.

15. The method as claimed in claim 1, further comprising outputting the warning signal via at least one of an ignition key, smartphone, horn and hazard warning light.

16. A system for automated parking of a vehicle comprising:
   parking assistance system, comprising a first control unit with instruction for requesting activation of the electromechanical parking brake in order to hold the vehicle stationary; and
   a brake system comprising a second control unit designed to actuate the electromechanical parking brake at the request of the parking assistance system; and
   a vehicle monitoring system with instructions for:
   monitoring a movement of the vehicle with a vehicle monitoring system; and
   deciding based on the monitored movement whether the vehicle has been successfully held by the electromechanical parking brake; and
   at least one of securing the vehicle independently of the electromechanical parking brake and outputting a warning signal when the holding is not successful.

17. The system as claimed in claim 16, wherein the vehicle monitoring system is implemented in the second control unit of the brake system.

18. The system as claimed in claim 17, wherein the second control unit has a first control device for controlling a hydraulic service brake and a second control device for controlling the electromechanical parking brake, the vehicle monitoring system being implemented in the second control device.

19. The system as claimed in claim 16, wherein the vehicle monitoring system is implemented in an additional control device.

* * * * *